P. CHRISTIANSEN.
LIQUID FERTILIZER DISTRIBUTER.
APPLICATION FILED FEB. 13, 1919.

1,347,892.  Patented July 27, 1920.

Inventor,
Peter Christiansen, by
G. C. Kennedy,
Attorney.

UNITED STATES PATENT OFFICE.

PETER CHRISTIANSEN, OF CEDAR FALLS TOWNSHIP, BLACKHAWK COUNTY, IOWA.

LIQUID-FERTILIZER DISTRIBUTER.

1,347,892. Specification of Letters Patent. Patented July 27, 1920.

Application filed February 13, 1919. Serial No. 276,836.

*To all whom it may concern:*

Be it known that I, PETER CHRISTIANSEN, a subject of the King of Denmark, and a resident of Cedar Falls township, Blackhawk county, Iowa, have invented certain new and useful Improvements in Liquid-Fertilizer Distributers, of which the following is a specification.

My invention relates to improvements in liquid fertilizer distributers, and the object of my improvement is to supply a transportable apparatus for distributing determinedly in various ways a liquid composition or fertilizer, said apparatus being controllable from a distance, and adapted for disassemblage of its parts.

Figure 1:
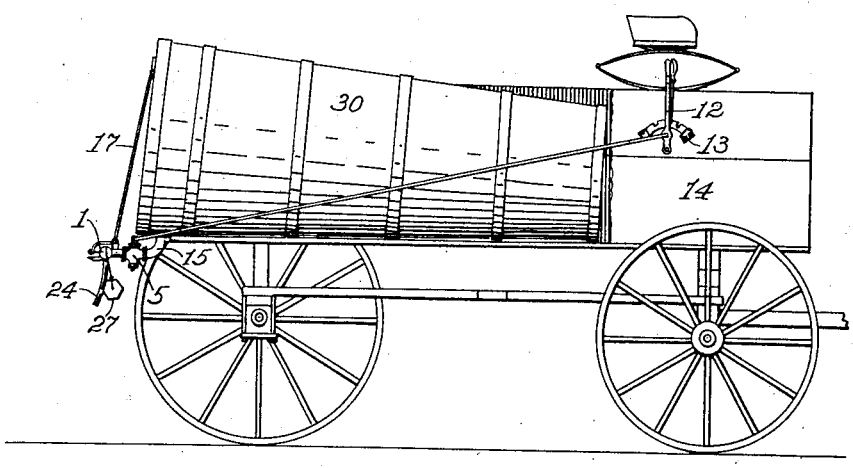
Figure 2:
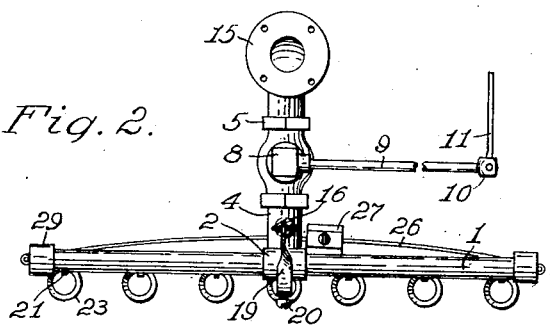
Figure 3:
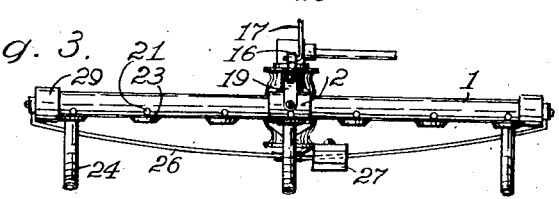
Figure 4:
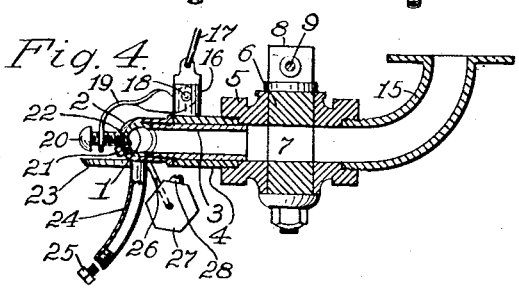

This object I have accomplished by the means which are hereinafter described and claimed, and which are illustrated in the accompanying drawings, in which Figure 1 is a side elevation of a wagon and tank carried thereon, the latter provided with my improved liquid distributer, parts of the wagon-box being broken away; Figs. 2 and 3 are enlarged views, in plan and rear elevation, respectively, of said distributing apparatus; and Fig. 4 is a more greatly magnified view, in medial longitudinal section of said apparatus, with parts broken away.

Similar numerals of reference denote corresponding parts throughout the several views.

My device is contrived to utilize liquid fertilizer, such as is collected in settling-tanks at stables or the like, by distributing it in desired locations, as along rows of growing crops, and is so constructed as to permit of its delivering the fertilizer in this or in a broadcast manner, as desired.

Referring to Fig. 1, the numeral 30 denotes a tank carried within the box 14 of a wagon. Upon said box, located conveniently near the driver's seat, a hand-lever 12 is pivoted to rock to and fro along a rack-sector 13, and held in an adjusted position by a manually-operated detent engaging notches in the sector. A rod 11 has its forward end pivotally connected to said lever, its rear end having an eye pivotally connected to a fork 10 on an arm 9 which is fixed on the outwardly-extending boss 8 of a rock-valve 6 in a valve-chamber 5.

A curved elbow-coupling 15 communicates between the said tank 30 near its rear end and the transverse channel 7 in the valve 6. A cylindrical tube 4 is fixedly inserted in said valve-chamber in occasional communication with the channel 7 of said valve. A cylindrical tube 3 is removably and telescopically fitted into the tube 4 and extends therein nearly to said valve 6 and its channel 7. The rear end of the tube 3 is fixed within a T-coupling 2.

The numeral 1 denotes a transverse distributer-pipe carried through said T-coupling to extend equally from opposite ends thereof, the ends of the pipe 1 being closed by caps 29.

Small delivery-orifices 22 are positioned at equal distances along the rear of said pipe 1, and may be closed by plugs 21, as shown in Fig. 4. The numeral 23 denotes small circular shallow pans fixed on the under side of the pipe 1 to project rearwardly horizontally just below said orifices 22 to receive therefrom.

The numeral 24 denotes a plurality of depending rearwardly curved tubes on said pipe 1, and in communication therewith. The ends of these tubes 24 may be closed by means of plugs 25.

16 is an upwardly-extending boss on the tube 4, having a bearing-orifice to receive a bent-over end of a brace-rod 17, the upper end of the latter secured to the tank 30. Said boss 16 is vertically slotted in the rear to receive the forward end of a downwardly-curved bar 19, the latter pivoted on a transverse pintle 18 at its forward end, and being orificed at its rear depending end to receive a set-screw 20, the latter bearing, removably, against the rear of said T-coupling 2, and engaged with a shallow socket therein.

As the tube 3 may rock freely in the tube 4, I have provided means for maintaining the distributer-pipe in a horizontal position, whatever the position of the wagon 14 may be on sloping surfaces. The numeral 26 denotes a rod, preferably somewhat curved forwardly and downwardly as shown, whose ends are bent upwardly and secured fixedly to the caps 29. A weight 27 is slidably mounted on said rod, having a longitudinal perforation through which the rod passes, and a set-screw 28 is used to secure the weight in an adjusted position on the rod to maintain the pipe 1 in horizontal equilibrium.

The hand-lever 12 is employed to rock the valve 6 to more or less open its channel 7 into communication with the tube 3 and pipe 1. When it is desired to deliver the liquid fertilizer upon a plurality of spaced rows of corn or other crop, the orifices 22 are closed by the plugs 21, the pipe 1 then delivering upon the rows by way of the depending tubes or nipples 24. If the fertilizer is to be distributed broadcast upon grass or other vegetation, the tubes 24 are stopped by the plugs 25, and the plugs 21 removed from the orifices 22. In the latter case, the orifices 22 deliver into the shallow pans 23, which when filled, overflow equally circumferentially in such a manner that the head of the liquid insures the spraying of the same equally upon the ground below.

As the distributer-pipe 1 is removable from the valve-chamber 5 by reason of its sleeve-connection 3—4, when the bar 19 is swung upwardly after the disengagement of the screw 20 from the T-coupling 2, the pipe 1 may be left at the field, doing away with the inconvenience of transporting it to and fro, and of passing narrow gate-ways.

Various modifications may be effected in the parts or arrangements of my said device, without, however, departing from the principles of the invention, or the scope of its protection.

Having described my invention, what I claim as new, and desire to secure by Letters Patent, is:

1. In combination, a valve-chamber in communication with a liquid-supply, an elongated conduit with closed ends and having delivery orifices, said conduit being in communication with said valve-chamber and mounted thereon to rock transversely thereof, and means for maintaining said conduit in an adjusted position of equilibrium, consisting of a rod supported on and positioned in spaced relation to said conduit, and a weight adjustably slidably mounted on and releasably secured to said rod.

2. In combination, a valve-chamber in communication with a liquid supply, a conduit with closed ends and having delivery openings, said conduit being in communication with said valve-chamber and mounted medially thereon to rock transversely thereof, and means for detachably pivoting said conduit on the valve-chamber, consisting of a standard fixedly supported on the valve-chamber, said conduit having a medial socket, and an arm pivoted to said standard, having its outer end provided with a threaded orifice, and a screw mounted in said orifice with an end inserted removably in said socket.

3. In combination, a tank mounted for transportation, a valve-chamber mounted on and in communication with said tank, an orificed plug-valve in said chamber, means for rocking said valve to place its orifice in communication with or cut off its communication with said tank, a bushing mounted on and in communication with the delivery end of said valve-chamber, a tube fitted in and adapted to rock in said bushing, a transverse tubular conduit provided with alined delivery orifices, closed at its ends, and fixed medially on said tube in communication therewith and with said valve-chamber, a standard erected fixedly on said bushing, a suspension-rod having one end secured removably to said tank and its other end secured removably to said standard, said conduit having an external medial socket, an arm having one end pivoted to said standard and its other end furnished with a threaded orifice, and a screw fitted in said orifice with an end removably seated in said socket to pivotally secure the conduit to the valve-chamber.

Signed at Cedar Falls, Ia., this 29th day of January, 1919.

PETER CHRISTIANSEN.